United States Patent
Ridl et al.

(10) Patent No.: US 6,505,789 B2
(45) Date of Patent: Jan. 14, 2003

(54) DATA STORAGE CARTRIDGE HAVING A TWO-SIDED RETAINER SPRING FOR A LEADER PIN

(75) Inventors: Peter A. Ridl, St. Paul, MN (US); Geoffrey A. Lauinger, Campbell, MN (US); Craig D. Lingwall, Wahpeton, ND (US); Kent S. Miller, New Effington, SD (US); Brad L. Miller, New Effington, SD (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 09/747,591

(22) Filed: Dec. 22, 2000

(65) Prior Publication Data

US 2002/0079396 A1 Jun. 27, 2002

(51) Int. Cl.⁷ ............................................ G11B 23/107
(52) U.S. Cl. ..................... 242/348.2; 360/132
(58) Field of Search ........................ 242/348.2; 360/132

(56) References Cited

U.S. PATENT DOCUMENTS

| | | |
|---|---|---|
| 4,383,660 A | 5/1983 | Richard et al. |
| 4,577,811 A | 3/1986 | Bray et al. |
| 5,303,875 A | 4/1994 | Hoge et al. |
| 5,465,187 A | 11/1995 | Hoge et al. |
| 5,492,284 A | 2/1996 | Sorensen |
| 5,868,338 A | 2/1999 | Martin et al. |
| 6,236,539 B1 * | 5/2001 | Morita et al. ............... 360/132 |

FOREIGN PATENT DOCUMENTS

| | | |
|---|---|---|
| EP | 0 924 701 A2 | 6/1999 |
| EP | 0 924 703 A1 | 6/1999 |
| EP | 0 926 675 A1 | 6/1999 |
| EP | 0 926 676 A1 | 6/1999 |

* cited by examiner

*Primary Examiner*—John Q. Nguyen
(74) *Attorney, Agent, or Firm*—Eric D. Levinson

(57) ABSTRACT

A data storage cartridge (10) includes a housing (12) having a first section (13) and a second section (14) operatively connected to each other. A first positioning member (40) and second positioning member (50) are operatively connected to the housing and are in axial alignment with each other. A leader pin (30) is positioned in the positioning members 40, 50 and held in position by the two-sided springs 44. The springs 44 are in position around a locating member 41, 51.

5 Claims, 7 Drawing Sheets

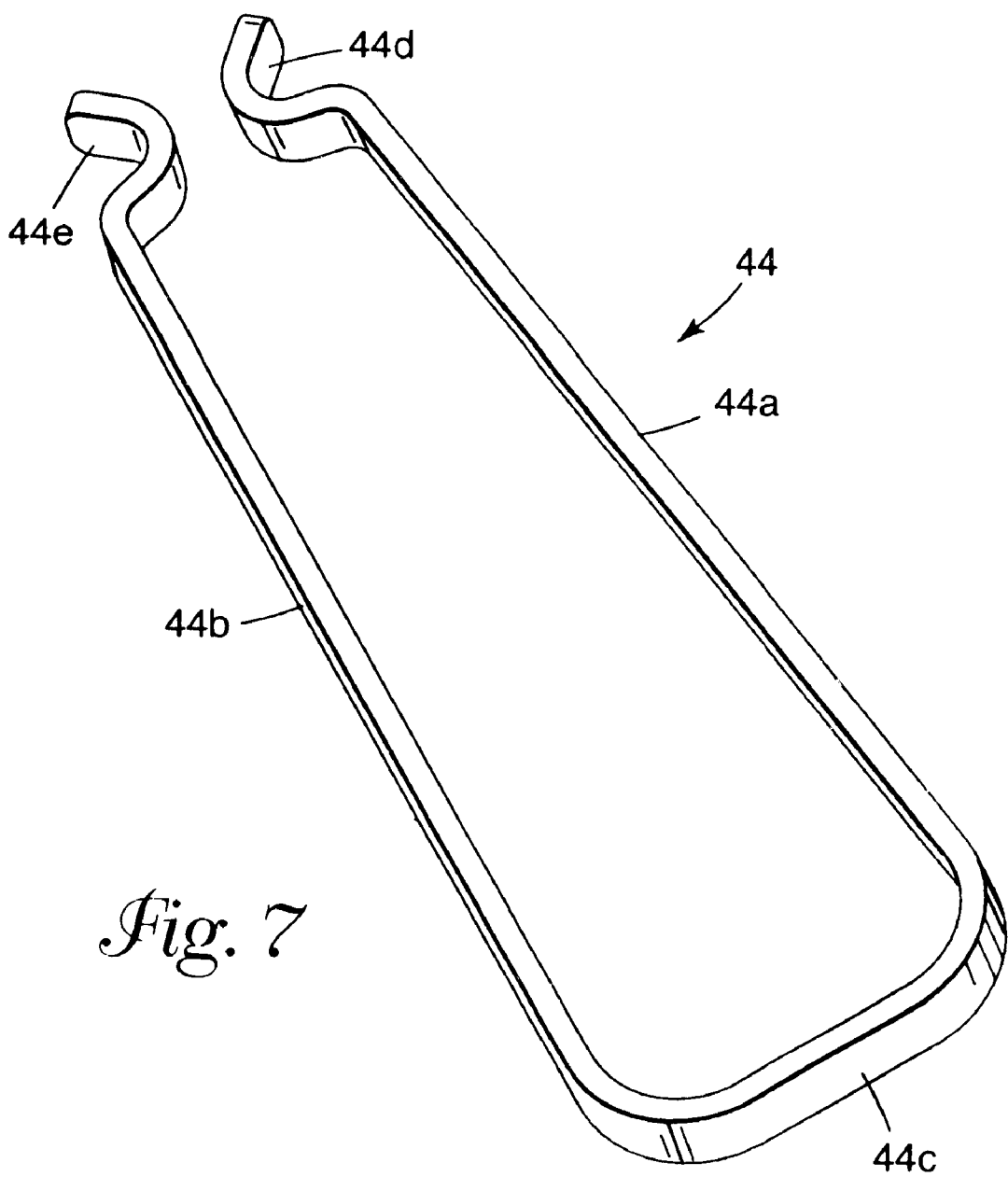

DATA STORAGE CARTRIDGE HAVING A TWO-SIDED RETAINER SPRING FOR A LEADER PIN

BACKGROUND OF THE INVENTION

This invention relates generally to a data storage tape cartridge and more particularly to a data storage tape cartridge having a two-sided retainer spring for a leader pin.

Cartridges have been used for decades in the computer, audio and video fields. The data storage tape cartridge continues to be an extremely popular form of recording large volumes of information for subsequent retrieval and use. The data storage cartridges typically have a housing which includes a base and a cover. These two components are secured together in a number of ways including screws and sonic welding. Sonic welding is not always acceptable because it causes debris that can settle onto the tape surface and cause errors when reading or writing information. Using screws is not always possible because there is not enough room to place the screws. Further, the cartridges have a tape access opening which is located proximate the leader pin or other end of tape attachment members, on which the tape is secured. The tape is accessed through the tape access opening. The leader pin needs to be secured in the data storage cartridge. The leader pin has been secured in many ways including placing the leader pin in the base and then capturing the leader pin by the cover. One of the problems associated with such a design is that it requires proper alignment for assembly.

The leader pin is often held in place by a one-sided wire form or flat spring configuration. The one-sided designs require locating the spring in the plastic shell very accurately. If the spring is distorted during the welding operation of the assembly process, the spring force on the retaining pin or leader pin will not be consistent. In addition, in assembling the cartridges, keeping the spring and the desired location as it is being secured is always a concern and creates for a more complex assembly process.

The present invention addresses the problems associated in the prior art noted above.

SUMMARY OF THE INVENTION

In one embodiment, the invention is a data storage cartridge having a housing with first and second sections operatively connected to form the housing. The housing defines a tape access opening. A first positioning member is operatively connected to the first section and a second positioning member is operatively connected to the second section, the positioning members are in axial alignment. An end of tape attachment member has a first end positioned in the first positioning member and a second end positioned in the second positioning member. A first spring locating member is operatively connected to the first section and a second spring locating member is operatively connected to the second section. A first spring is positioned around the first spring locating member. The first spring has a bias to maintain the first spring in position around the first spring locating member. The first spring contacts the tape attachment member to releasably secure the tape attachment member to the data storage cartridge. A second spring is positioned around the second spring locating member. The second spring has a bias to maintain the second spring in position around the second spring locating member. The second spring contacts the tape attachment member to releasably secure the tape attachment member to the data storage cartridge.

In another embodiment, the invention is a data storage cartridge having a housing with first and second sections operatively connected to form the housing. The housing defines a tape access opening. A first positioning member is operatively connected to the first section and a second positioning member is operatively connected to the second section, the positioning members in axial alignment. An end of tape attachment member has a first end position in the first positioning member and a second end positioned in the second positioning member. A first spring locating member is operatively connected to the first section and the first spring locating member has a first side and a second side. A second spring locating member is operatively connected to the second section, the second spring locating member having a first side and a second side. The first spring has first and second members, the first member in contact with the first side of the spring locating member and the second member in contact with the second side of the spring locating member, the first spring having a bias to position the first spring around the first spring locating member and at least one of the first and second members in contact with the tape attachment member to releasably secure the tape attachment member to the data storage cartridge. A second spring has first and second members. The first member is in contact with the first side of the second spring locating member and the second member is in contact with the second side of the second spring locating member. The second spring has a bias to position the second spring around the second spring locating member, at least one of the first and second members of the second spring in contact with the tape attachment member to releasably secure the tape attachment member to the data storage cartridge.

In another embodiment, the invention is a method of assembly of a data storage cartridge. The data storage cartridge having a first section and a second section, a first positioning member operatively connected to the first section and a second positioning member operatively connected to the second section. The method includes placing a first spring having two members around the first positioning member, wherein the two members are on opposing sides and the two members have a bias force against the first positioning member to hold the first spring in position. A second spring having two members is placed around the second positioning member, wherein the two members are on opposite sides and the two members have a bias force against the second positioning member to hold the second spring in position. At a separate station from the first spring insertion, the first spring is secured in position around the first positioning member. At a separate station from the second spring insertion, the second spring is secured in position around the second positioning member. Then, the first and second sections are operatively connected, wherein the tape attachment member is insertable through a tape access opening to be positioned by the first and second positioning members and releasably held in position by the first and second springs.

BRIEF DESCRIPTION OF THE DRAWINGS

FIG. 7 is a perspective view, viewed generally from above, of the spring of the data cartridge shown in FIG. 1.

DETAILED DESCRIPTION OF THE PREFERRED EMBODIMENT

Figure 1:
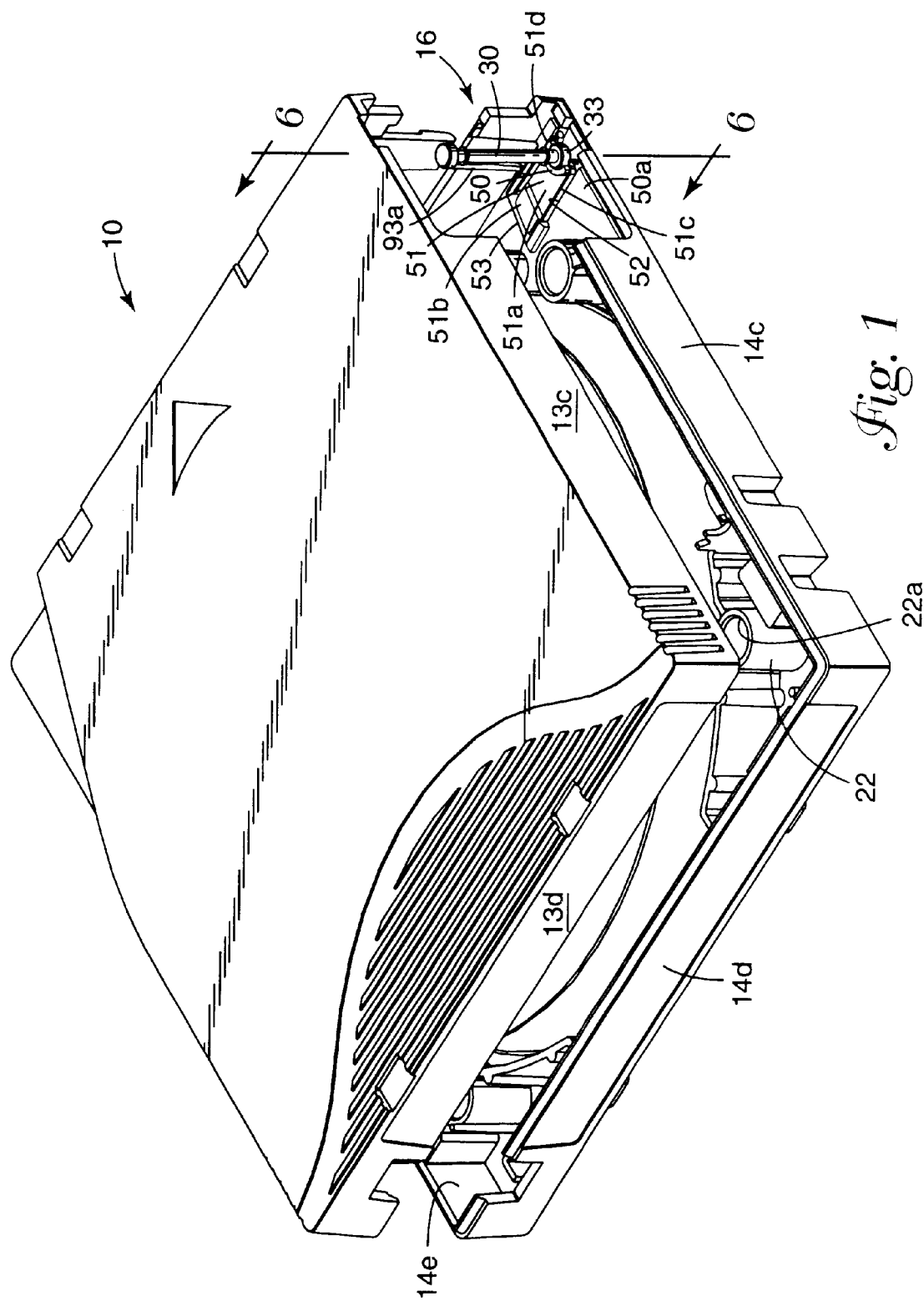
FIG. 1 is an exploded perspective view of a data tape cartridge in accordance with the present invention, viewed generally from above.

Referring to the drawings, wherein like numerals represent like parts throughout the several views, there is generally disclosed at 10 a data storage tape cartridge. Generally speaking, the data storage tape cartridge 10 includes a housing 12 having a first section 13 and a second section 14. A tape reel assembly 15 is utilized to house the storage tape (not shown). The storage tape is wound around the tape reel assembly 15.

The housing 12 is preferably sized to receive a typical tape drive (not shown). Thus, the housing 12 may be sized for use within a 5.25-inch (130 millimeter) form factor drive or a 3.5-inch (90 millimeter) form factor drive or other useful sizes. In one preferred embodiment, the first section 13 forms a cover whereas the second section 14 serves as a base. It should be understood that the directional terminology, such as "cover", "base", "upper", "lower", "top", "bottom", etc. are used for purposes of illustration only, and are in no way limiting. The first section 13 has a planar member 13a which has four sidewalls 13b–13e which depend generally at a 90-degree angle from the planar member 13a that has an outer surface 70 and an inner surface 71. Arcuate inner walls 17–19 are formed which define a cavity for the tape reel assembly 15. Four cylinders 20 extend from the planar member 13a. The cylinders 20 have an opening 20a at one end. The cylinders are hollow to receive a screw, as will be described more fully hereafter. An elongate brake post 21 extends upward from the planar member 13a. The brake post engages a brake button (not shown) which in turn engages the tape reel assembly 15.

The second section 14 has a planar member 14a, that has an outer surface 72 and an inner surface 73, which has four sidewalls 14b–14e which depend generally at a 90-degree angle from the planar member 14a. An aperture (not shown) is formed in the planar member 14a and provides access for a tape drive (not shown) to the tape reel assembly 15. There are three arcuate inner walls which correspond to the arcuate walls 17–19, to form a cavity for the tape reel assembly 15. Cylindrical posts 22 extend upward from the planar member 14a. There are four cylindrical posts 22 which are in alignment with the cylinders 20. The cylindrical posts 22 have an opening 22a at one end and another opening (not shown) at their other end which is formed in the planar member 14a. The cylinders 20 are sized and configured to fit inside the cylindrical posts 22. Then, when assembled, screws (not shown) are inserted through the openings of the cylinder 22 through the planar member 14a and tightened to secure the two sections together to form the housing 12. Preferably, the sections 13 and 14 are formed as separate integral moldings from a suitable material such as polycarbonate. The data storage cartridge described thus far is a typical data storage cartridge, the construction of which is well known in the art.

A tape access opening 16 is formed in the housing 12. The opening 16 is formed from openings formed in the sidewalls 13c and 14c. The opening 16 provides access to the leader pin 30. The leader pin 30 is an end of tape attachment member and is generally dumbbell shaped and has an elongate shaft 31 having cylindrical ends 32 and 33 connected thereto. The cylindrical ends 32 and 33 have diameters which are larger than the diameter of the shaft 31. While this invention is being described as the preferred embodiment having a leader pin 30, it is understood that one skilled in the art would also understand that it may be used with other end of tape attachment members, such as a leader block.

A first positioning member 40 is operatively connected to the first section 13 and a second positioning member 50 is operatively connected to the second section 14. A preferred embodiment, the positioning members 40, 50 are an integral portion of their respective sections 13, 14. The positioning members 40, 50 are arcuate. As shown, the positioning members 40, 50 are generally in the shape of a semicircle. The positioning members 40, 50 are sized and configured to mate with the size and configuration of the cylindrical ends 32, 33. While other configurations are possible, the arcuate configuration allows for the easy insertion of the leader pin 30 without having to worry about the orientation of the leader pin 30. The positioning members 40, 50 are in axial alignment with each other so that the leader pin 30 is generally perpendicular to the planar members 13a, 14a. As can be seen in the Figures, the positioning members 40, 50 are an integral portion of their respective sections 13, 14 and are formed by a cutout of the planar members 13a, 14a. The top surface of the positioning members 40, 50 are approximately even with the surfaces 71, 73. A first spring locating member 41 is operatively connected to the first section 13 and a second spring locating member 51 is operatively connected to the second section 14. In a preferred embodiment, the spring locating members 41, 51 are an integral portion of their respective sections 13, 14. The spring locating members 41, 51 are generally rectangular in shape and have a top surface 41a, 51a which is generally planar with the surfaces 71, 73. As can be seen, the spring locating members 41, 51 are formed by removing a portion of the planar members 13a, 14a by forming a trough or recess 42, 52 around the spring locating members 41, 51. At one end of the spring locating members 41, 51 are positioning members 40, 50. At the other end is a raised section 41b, 51b. A sacrificial member 43, 53 is positioned around the trough 42, 52. The sacrificial member 43, 53 extends above the surfaces 71, 73 and provides for a material to secure a spring, as will be described more fully hereafter.

Referring to FIG. 7, a spring 44 is shown. The spring 44 has a first side 44a operatively connected to a second side 44b by an intermediate section 44c. Operatively connected to the first member 44a at its free end is an arcuate portion 44d for releasably securing the leader pin 30. A similar arcuate portion 44e is operatively connected to the second member 44b and also releasably secures the leader pin 30. The spring 44 is formed so that when positioned around the spring locating members 41, 51 there is a preload or biasing force tending to urge the first member 44a towards the second member 44b. As shown in the drawings, the members 44a, 44b are angled slightly inward. This is because the locating members 41, 51 have generally parallel sides. It is therefore necessary for the members 44a, 44b to be spread apart in order to be inserted around the locating members 41, 51. The spreading apart of the first and second members 44a, 44b provide the biasing force to hold the spring in position. The spring locating members 41, 51 have a first side 41c, 51c and a second side 41d, 51d. The sides 41c, 51c are generally parallel to the sides 41d, 51d.

Figure 2:
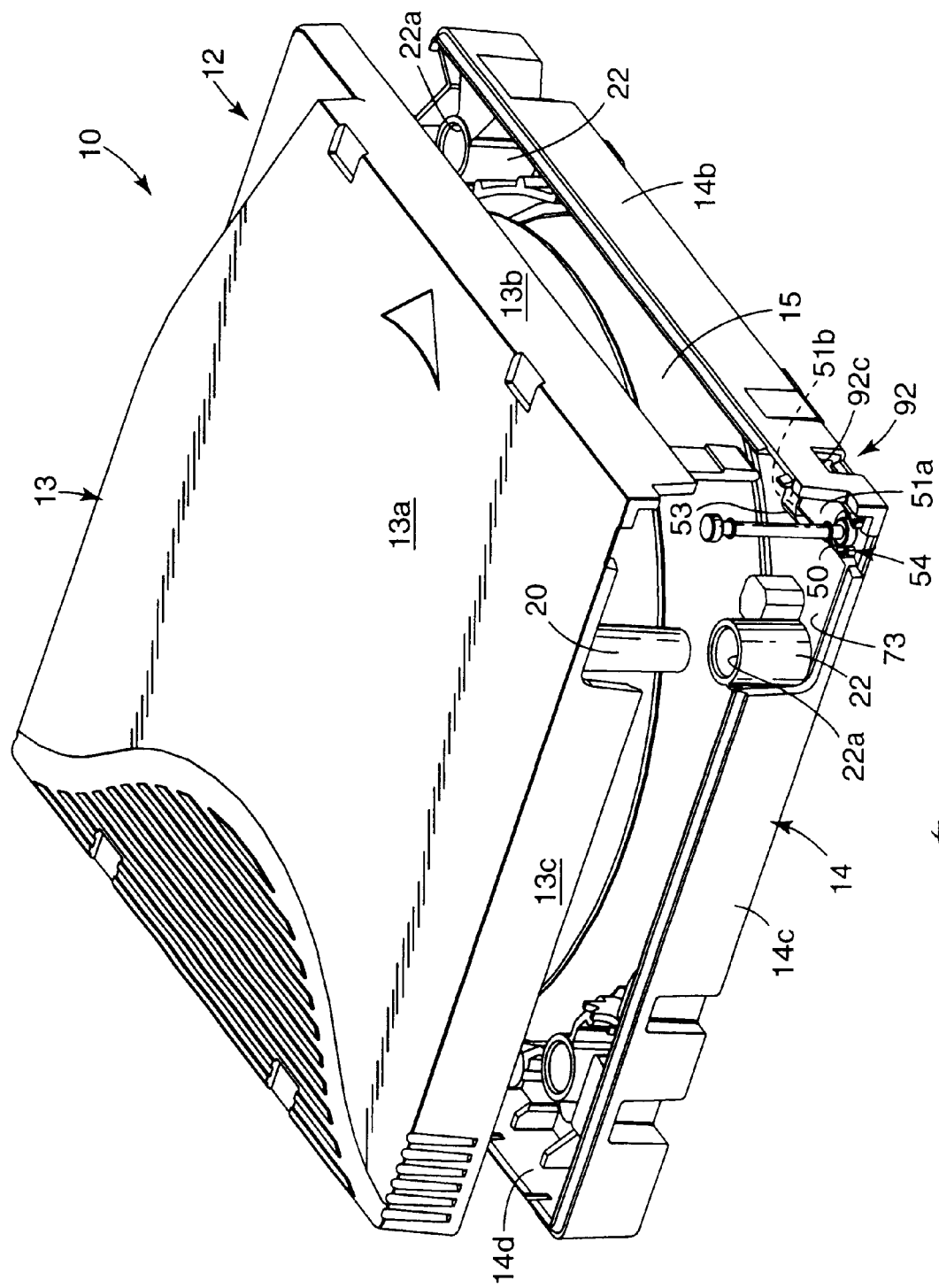
FIG. 2 is an exploded perspective view of the data cartridge shown in FIG. 1, rotated 90 degrees.
Figure 3:
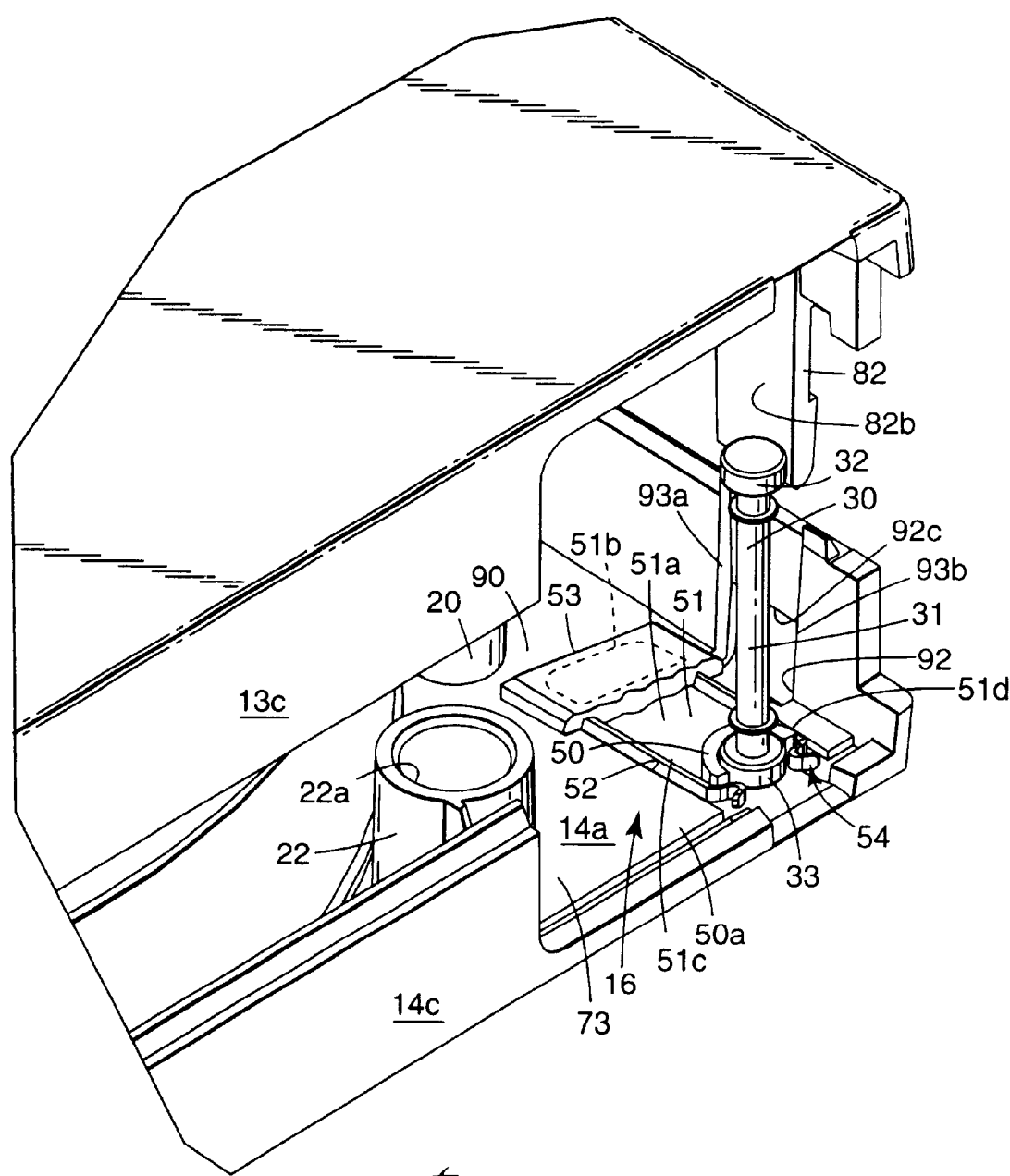
FIG. 3 is an enlarged perspective view of a portion of the cartridge shown in FIG. 1.
Figure 4:
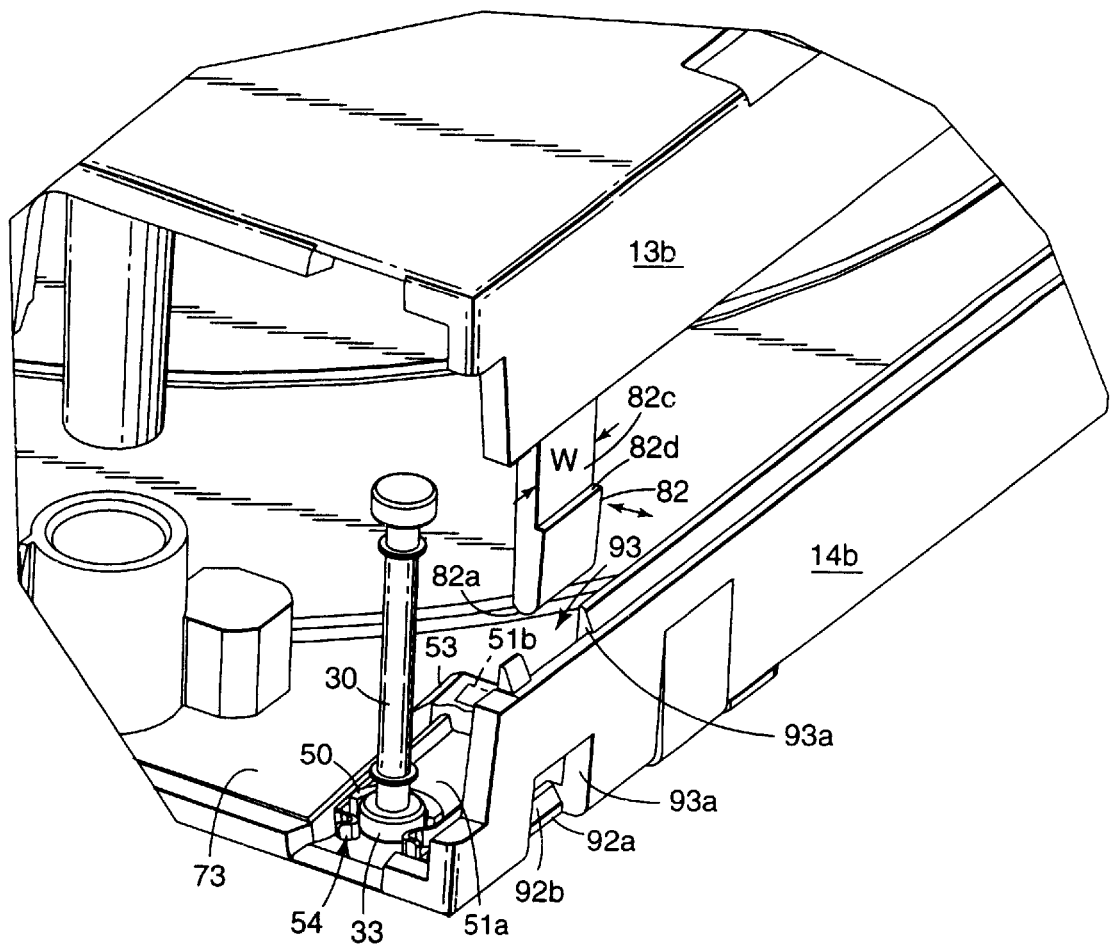
FIG. 4 is an enlarged perspective view of the cartridge shown in FIG. 2.
Figure 5:
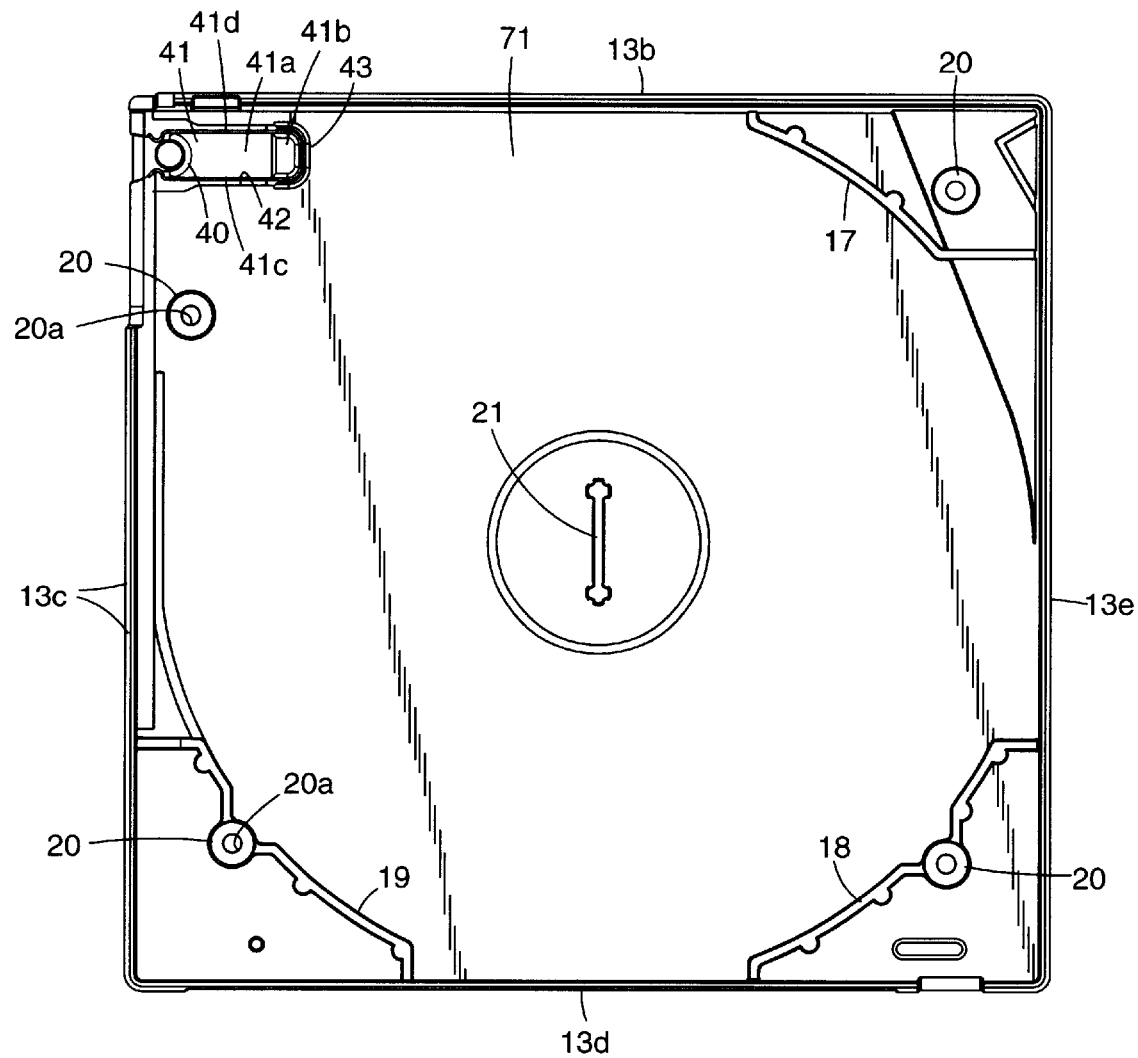
FIG. 5 is an inside plan view of a portion of the cartridge shown in FIG. 1.

In securing the springs 44 to the locating members 41, 51, the springs 44 are first placed around the locating members 41, 51. The first and second members 44a, 44b are positioned around the locating members 41, 51 and the two members 44a, 44b provide a biasing force against the sides 41c, 51c and 41d, 51d, to hold the springs in position. This bias provides for a force which holds the springs 44 in position to allow for the next operation to operatively connect the springs 44 to the sections 13, 14. This may be done at a separate assembly station from the insertion of the spring assembly station, thereby greatly simplifying the assembly process as it is not necessary to both insert and secure the spring at one station. One method of operatively connecting the springs to the sections 13, 14 is to stake weld the springs 44. This is accomplished by applying heat to the sacrificial member 43, 53 which melts the sacrificial member which fills the top portion of the recess 42 around the intermediate section 44c and holds the springs 44 in position. The free ends of the first and second members 44a, 44b are free to move apart from each other in the recess 42, 52 as only the intermediate section 44c is welded. FIGS. 1 and 4 show the generally U-shaped sacrificial members 43, 53 before they have been melted. FIGS. 2–4 show the sacrificial member melted over the intermediate section 44c of the spring 44 to secure the spring 44 in position.

Figure 6:
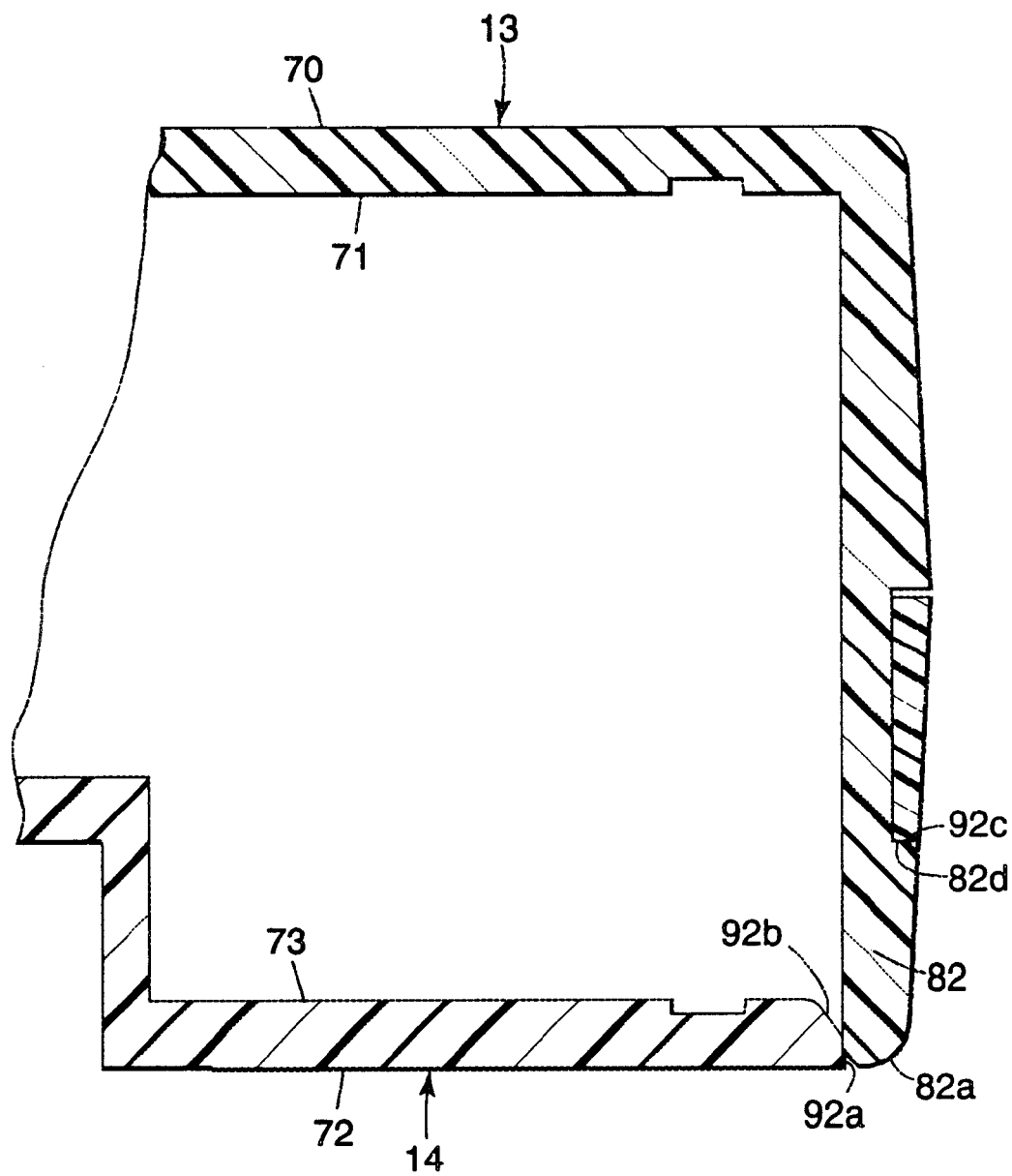
FIG. 6 is a partial (non-exploded) cross-sectional view of the data cartridge shown in FIG. 1.

As best seen in FIGS. 3, 4 and 6, there is provided a lock to further secure a portion of sections 13 and 14 together proximate the tape access opening 16. A flexible post 82 is operatively connected to the sidewall 13b. Preferably the post 82 is an integral portion of the molding of the section 13. The post 82 is rigid with respect to movement sideways, but is flexible in a direction as shown by the arrows in FIG. 4. That is, it is flexible in a direction perpendicular to the sidewall 14b. Typically, the end 82a would be capable of moving approximately ⅛ inch or more relative to the sidewalls 13b or 14b, although it is recognized that flexibility to this great of an extent is not required. The post 82 has a generally planar back surface 82b. The end 82a has a slight curvature to assist in obtaining a snap fit, as will be described more fully hereafter. A notch is formed in the top portion of the flexible post 82. The notch has a generally planar surface 82c which is generally parallel to the planar back surface 82b and the notch has a locking surface 82d which is generally perpendicular to the planar surface 82c. The post 82 has a width "W" which is approximately 5 millimeters wide. The post 82 is sized and configured to form a snap fit with an opening 92 which is formed in the sidewall 14b. A slot 93 is formed in the sidewall 14b and has two perpendicular walls 93a and 93b. The sidewalls 93a and 93b extend to the bottom of the planar surface 14a and also form the sides of the opening 92. The width of the slot 93 and opening 92 is only slightly larger than the width "W" of the flexible post 82. The extra width is approximately 0.1 millimeters to 0.2 millimeters. The bottom of the opening 92 has a first wall 92a which is generally parallel to the surfaces 82b and 82c and perpendicular to locking surface 82d. An angled guide wall 92b is at an angle, and is preferably from 30 to 60 degrees, to the first wall 92a and extends to the inside surface of the planar member 14a. The opening 92 has a top wall 92c which is generally perpendicular to the surfaces 82b and 82c.

In assembling the sections 13 and 14 together, it is preferable to first secure the snap fit, as will be described hereinafter, before the screws are assembled through the cylinder 22 and cylinder posts 20. The post 82 is positioned above the slot 93 and the side walls 92a and 92b of the slot guide the post 82 as it is moved downwards towards the opening 92. The bottom 82a of the post 82 contacts the angled guide wall 92b. This forces the bottom of 82a of the post 82 outward as it is pushed downward. The height of the opening 92 is sized to be the height of the lower section (below surface 82d) of the locking post 82. Therefore, once the locking surface 82d passes underneath the top wall 92c, the post 82 has a snap fit with the opening 92. Two pairs of locking surfaces are formed which are perpendicular to each other. The first pair of locking surfaces are locking surface 82d and the top wall 92c. The second pair of locking surfaces are first sidewall 92a and the planar back surface 82b.

The snap fit provided by the post 82 and opening 92 more firmly secures the sections 13 and 14 together, thereby providing a more secure fastening in the area of the leader pin 30. The leader pin 30 is sized to have a height substantially the same as the distance between the planar members 14a and 13a. Therefore, the leader pin 30 may easily be slit into position into the positioning members 40 and 50. As the leader pin 30 moves into the positioning members 40 and 50, the cylindrical ends 32, 33 push the arcuate ends 44d, 44e away to allow the cylinder ends 32 and 33 to be positioned in the positioning members 40, 50. Then, the spring force provides a positive force to capture and hold the leader pin 30 in position. One advantage of the present invention is that the spring 44 provides force on both sides of the leader pin by the arcuate ends 44d, 44e. This provides for a force on both sides of the leader pin which provides for a more consistent and even force. This provides for a more consistent spring force after assembly. The initial preloading or biasing of the spring 44 around the locating members 41, 51 allow for self-centering during the welding and provides for the natural retention of the spring 44 around the locating members 41, 51 during welding. With previous single leg designs of the prior art, it was required that the single leg spring be precisely located. If the spring of the prior art was distorted during the welding operation of the assembly, the spring force on the retaining spring was not consistent. The two-sided spring of the present invention overcomes these problems. However, it is also recognized that it is not necessary that the spring 44 have two sides which come in contact with the leader pin. It is preferred that both sides come in contact with the leader pin in order to apply a more even consistent force to the leader pin. However, the additional advantage of the present invention of locating the spring around the locating member is still possible if one of the members 44a, 44b was shorter. The members, even if not the same length, would still provide an opposing biasing force to hold the spring 44 in position around the locating members 41, 51 during assembly.

We claim:
1. A data storage cartridge comprising:
a) a housing having a first section and a second section operatively connected to form the housing, the housing defining a tape access opening;
b) a first positioning member operatively connected to the first section and a second positioning member operatively connected to the second section, the positioning members in axial alignment with each other;
c) an end of tape attachment member having a first end positioned in the first positioning member and a second end positioned in the second positioning member;
d) a first spring locating member operatively connected to the first section;
e) a second spring locating member operatively connected to the second section;
f) a first spring positioned around and secured to the first spring locating member, the first spring having a bias to maintain the first spring in position around the first spring locating member, the first spring having a first member operatively connected to a second member, the first and second members of the first spring each contacting the tape attachment member to releasably secure the tape attachment member to the data storage cartridge, the tape attachment member positioned between the first and second members of the first spring; and g) a second spring positioned around and secured to the second spring locating member, the second spring having a bias to maintain the second spring in position around the second spring locating member, the second spring having a first member operatively connected to a second member, the first and second members of the second spring each contacting the tape attachment member to releasably secure the tape attachment member to the data storage cartridge, the tape attachment member positioned between the first and second members of the second spring.

2. The data storage cartridge of claim 1, wherein the end of tape attachment member is a leader pin.

3. The data storage cartridge of claim 2, wherein the positioning members are arcuate.

4. The data storage cartridge of claim 3, wherein the arcuate members extend through an arc of 180 degrees and have an opening proximate the tape access opening to allow the leader pin to be inserted through the access opening.

5. The data storage cartridge of claim 1, wherein the first and second members of the first and second springs creating a preload when positioned around the locating members.

* * * * *